(12) United States Patent
Lee et al.

(10) Patent No.: US 9,696,533 B2
(45) Date of Patent: Jul. 4, 2017

(54) OPTICAL IMAGE SCANNING COMPONENT AND MICROSCOPE DEVICE

(71) Applicant: SOUTHPORT CORPORATION, Taipei (TW)

(72) Inventors: Yu-Yang Lee, Taipei (TW); Feng-Chieh Li, Taipei (TW)

(73) Assignee: SOUTHPORT CORPORATION, Taipei (TW)

( * ) Notice: Subject to any disclaimer, the term of this patent is extended or adjusted under 35 U.S.C. 154(b) by 0 days.

(21) Appl. No.: 14/944,842

(22) Filed: Nov. 18, 2015

(65) Prior Publication Data

US 2016/0259157 A1 Sep. 8, 2016

(30) Foreign Application Priority Data

Mar. 3, 2015 (TW) .............................. 104106693 A (51) Int. Cl.
| | | |
|---|---|---|
| *G02B 26/08* | (2006.01) | |
| *G02B 21/00* | (2006.01) | |
| *G02B 26/10* | (2006.01) | |

(52) U.S. Cl.
CPC ....... *G02B 21/0048* (2013.01); *G02B 26/101* (2013.01)

(58) Field of Classification Search
CPC .. G02B 21/0048; G02B 21/06; G02B 26/101; G02B 26/0816; G02B 26/105; G02B 7/005; G02B 21/002; G02B 21/0024
USPC ..................... 359/202.1, 368, 388
See application file for complete search history.

(56) References Cited

U.S. PATENT DOCUMENTS

| | | | |
|---|---|---|---|
| 2006/0291039 A1 | 12/2006 | Eda et al. | |
| 2011/0284720 A1 | 11/2011 | Wu et al. | |
| 2012/0243081 A1* | 9/2012 | Honda ................. | G02B 26/101 359/388 |

FOREIGN PATENT DOCUMENTS

| | | |
|---|---|---|
| TW | 200538758 A | 12/2005 |
| TW | 201142352 A | 12/2011 |

OTHER PUBLICATIONS

Alexander J. Nichols et al., "Video-rate Scanning Confocal Microscopy and Microendoscopy", J. Vis. Exp. (56), e3252, Oct. 20, 2011, pp. 1-10.

* cited by examiner

*Primary Examiner* — Euncha Cherry
(74) *Attorney, Agent, or Firm* — Muncy, Geissler, Olds & Lowe PC (57) ABSTRACT

An optical image scanning component is suitable to receive a light provided by a light source of a microscope device and comprises a first scanning unit and a second scanning unit. The first scanning unit comprises a first scanning mirror rotated along a first direction as axis at a first resonance frequency. The second scanning unit comprises a second scanning mirror rotated along a second direction as axis at a second resonance frequency which is different from the first resonance frequency. The light is emitted to the first scanning mirror and reflected to the second scanning mirror, and the light is reflected by the second scanning mirror to be transmitted to an objective lens module of the microscope device.

16 Claims, 8 Drawing Sheets

OPTICAL IMAGE SCANNING COMPONENT AND MICROSCOPE DEVICE

CROSS REFERENCE TO RELATED APPLICATIONS

This Non-provisional application claims priority under 35 U.S.C. §119(a) on Patent Application No(s). 104106693 filed in Taiwan, Republic of China on Mar. 3, 2015, the entire contents of which are hereby incorporated by reference.

BACKGROUND OF THE INVENTION

Field of Invention

This invention relates to an optical image scanning component and, in particular, to an optical image scanning component which can be applied to a microscope device.

Related Art

Microscopy refers to observing the surface of an object by using the optical principle, and the field related to the application of microscopy can be roughly divided into the electron microscope and the optical microscope according to the observation and the development of the nano-scale products. The former one refers to observing a microscopic crystal structure by the short-wavelength characteristic of the electron, and the latter one refers to magnifying the image of the sample by the optical lens.

In the optical microscope, the laser scanning confocal microscope becomes the technology attracting much attention in recent years. The laser scanning confocal microscope concentrates the light provided by a light source on the surface of the sample by the objective lens and condenser. If the sample is located on the focus, the reflected light of the sample will be concentrated again on the light source to cause the confocal effect. However, because the objective lens of the conventional confocal microscope needs to be adjusted to change the focal position for the scans of different regions, the user will feel uncomfortable. The adjustment of the objective lens to change the focal position not only requires complicated structure but also increases the measurement error and decreases the rate of measurement.

Therefore, it is an important subject to provide an optical image scanning component and a microscope device which have a simple structure and can improve the rate of measurement.

SUMMARY OF THE INVENTION

In view of the foregoing subject, an objective of this invention is to provide an optical image scanning component which has a simple structure and can improve the rate of measurement and can be applied to the microscope device.

To achieve the above objective, an optical image scanning component of this invention is suitable to receive a light provided by a light source of a microscope device.

The optical image scanning component comprises a first scanning unit and a second scanning unit. The first scanning unit comprises a first scanning mirror rotated along a first direction as axis at a first resonance frequency. The second scanning unit comprises a second scanning mirror rotated along a second direction as axis at a second resonance frequency which is different from the first resonance frequency. The light is emitted to the first scanning mirror and reflected to the second scanning mirror, and the light is reflected by the second scanning mirror to be transmitted to an objective lens module of the microscope device.

A microscope device of this invention comprises a light source, an optical module, an optical image scanning component and an objective lens module. The light source provides a light. The optical module comprises a plurality of optical lenses and has a light input side. The optical image scanning component comprises a first scanning unit and a second scanning unit. The first scanning unit comprises a first scanning mirror rotated along a first direction as axis at a first resonance frequency. The second scanning unit comprises a second scanning mirror rotated along a second direction as axis at a second resonance frequency which is different from the first resonance frequency. The light enters into the optical module through the light input side. When passing through the optical module, the light is emitted to the first scanning mirror and reflected to the second scanning mirror by the first scanning mirror, and the light is reflected to the objective lens module by the second scanning mirror and is emitted to a sample after passing through the objective lens module.

In one embodiment, the first resonance frequency is less than or equal to 32 KHz.

In one embodiment, the second resonance frequency is 0~1 KHz.

In one embodiment, the optical image scanning component further comprises a third scanning unit. The third scanning unit comprises a third scanning mirror, which is rotated along the first direction as axis at a third resonance frequency. The third scanning unit is disposed between the first scanning unit and the second scanning unit. The light is transmitted to the third scanning mirror after being reflected by the first scanning mirror, and is reflected to the second scanning mirror by the third scanning mirror.

In one embodiment, the third resonance frequency is substantially the same as the second resonance frequency.

In one embodiment, the first direction is substantially perpendicular to the second direction.

In one embodiment, the optical image scanning component further comprises a control unit. The control unit is electrically connected with the first scanning unit and the second scanning unit and outputs a first control signal and a second control signal to control the first scanning mirror and the second scanning mirror to rotate.

In one embodiment, the second scanning unit further comprises an actuator. The second scanning mirror is disposed on the actuator, and the actuator is electrically connected with the control unit and drives the second scanning mirror to rotate along the second direction as axis according to the second control signal.

In one embodiment, the first scanning unit is a resonant scanner, a MEMS (Microelectromechanical Systems) element (deflector) or rotational poly-scanner.

As mentioned above, this invention can enhance the scanning flexibility and applicability by providing two scanning units and respectively adjusting their scanning positions and scanning rates. Besides, the optical image scanning component of this invention can act as an additional component to cooperate with an existing microscope device. Thereby, this invention can provide an optical image scanning component and a microscope device which have a simple structure and can improve the rate of measurement.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

To be noted, in the following embodiments and figures, the elements and steps not directly related to this invention are omitted and not shown. Besides, the dimension relationship between the elements of the figures is just for the easy understanding but not for limiting the actual dimensions and the scope of the invention.

Figure 1A:
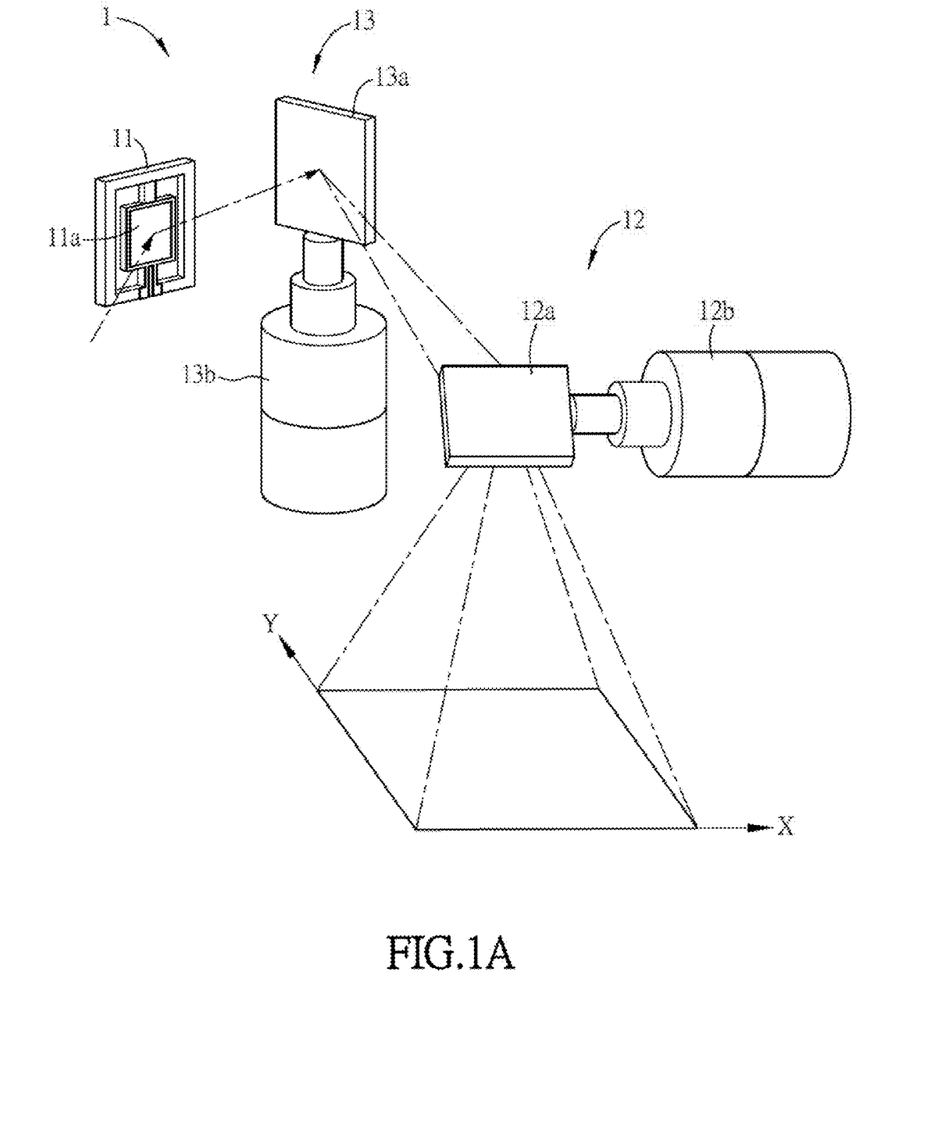
FIG. 1A is a schematic diagram of the optical image scanning component of an embodiment of the invention.
Figure 1B:
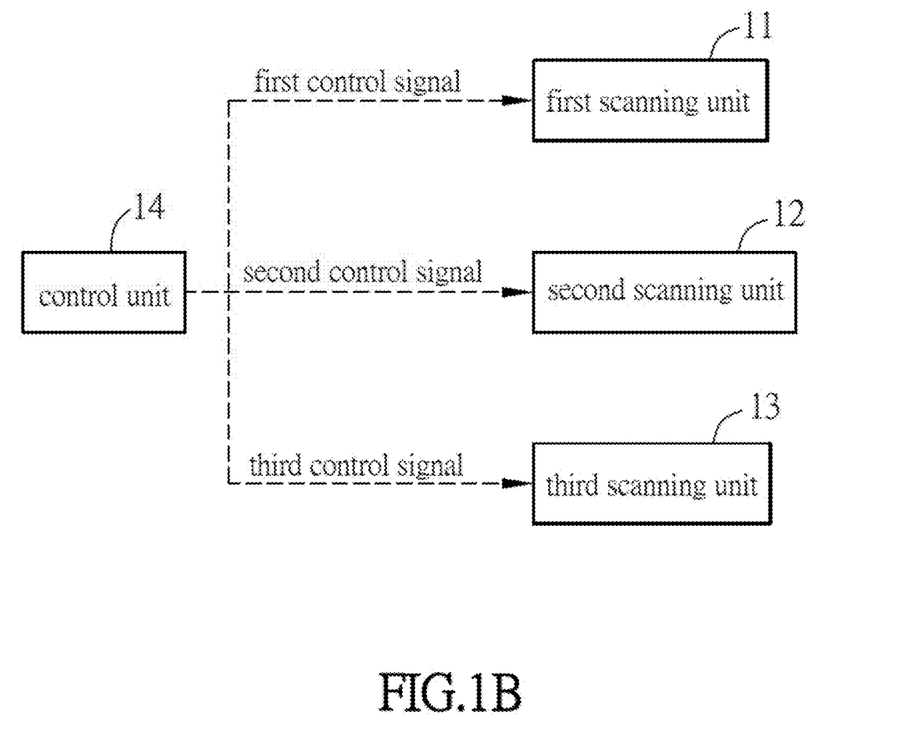
FIG. 1B is a system block diagram of the optical image scanning component of an embodiment of the invention.

Refer to FIGS. 1A and 1B, wherein FIG. 1A is a schematic diagram of the optical image scanning component of an embodiment of the invention, and FIG. 1B is a system block diagram of the optical image scanning component of an embodiment of the invention.

The optical image scanning component 1 of this embodiment is suitable to receive the light provided by the light source of the microscope device (not shown). The cooperation of the optical image scanning component 1 of this embodiment with the microscope device can be comprehended by referring to FIG. 4, but this invention is not limited to the cooperation manner shown in FIG. 4. Moreover, although not shown in the figure, the light can be transmitted through the optical fiber.

The optical image scanning component 1 includes a first scanning unit 11 and a second scanning unit 12. The first scanning unit 11 includes a first scanning mirror 11a, which is rotated along a first direction (X direction) as axis at a first resonance frequency. The second scanning unit 12 includes a second scanning mirror 12a, which is rotated along a second direction (Y direction) as axis at a second resonance frequency. The first direction and the second direction are different from each other, and in this embodiment they are substantially perpendicular to each other. However, this invention is not limited thereto.

In this embodiment, the second scanning unit 12 further includes an actuator 12b. The second scanning mirror 12a is disposed on the actuator 12b, so that the actuator 12b can be driven to make the second scanning mirror 12a rotate along the second direction (Y direction) as axis.

Particularly, the first resonance frequency is different from the second resonance frequency, so that the first scanning mirror 11a and the second scanning mirror 12a of this embodiment can rotate not only along different axes but also at different frequencies. The second scanning mirror 12a can make the incident light oscillate in different directions. Because the resonance frequency of the first scanning mirror 11a is higher than that of the second scanning mirror 12a, the first scanning mirror 11a can adjust the resonance frequency of the light transmitted from the second scanning mirror 12a to the first scanning mirror 11a and increase the scanning rate.

The first scanning unit 11 can be a MEMS (Microelectromechanical Systems) element (deflector), a resonant scanner or a rotational poly-scanner. In this embodiment, the first scanning unit 11 is a MEMS element and further can be a MEMS oscillatory reflector element, such as a resonance mirror element or a rotational polygon mirror. The second scanning unit 12 is a galvano mirror unit. The first resonance frequency of the first scanning mirror 11a is 16 KHz. The first resonance frequency can be adjusted according to the practical requirement. In other embodiments, the first resonance frequency may be 32 KHz. The second resonance frequency of the second scanning mirror 12a is 1 KHz. In other embodiments, the second resonance frequency of the second scanning mirror 12a is 0~1 KHz. In this embodiment, the first scanning mirror 11a can oscillate at a predetermined frequency by receiving the application of the electrostatic voltage. Moreover, by means of adjusting the magnitude of the current transmitted to the second scanning unit 12, the deflective angle of the light that leaves the second scanning mirror 12a can be adjusted. In this embodiment, the scanning rate of the microscope device can be adjusted by the frequency of oscillation of the first scanning unit 11, and besides, the scanning position of the microscope device on the second direction (Y direction) can be adjusted by means of adjusting the rotation angle of the second scanning mirror 12a of the second scanning unit 12.

In this embodiment, the optical image scanning component 1 can further include a third scanning unit 13 and also can include a third scanning mirror 13a and an actuator 13b. The third scanning mirror 13a is disposed on the actuator 13b. Therefore, the actuator 13b can drive the third scanning mirror 13a to rotate along the first direction (X direction) as axis at a third resonance frequency. In this embodiment, the third scanning unit 13 is disposed between the first scanning unit 11 and the second scanning unit 12. Furthermore, the light leaving the first scanning mirror 11a will be emitted to the third scanning mirror 13a and then reflected to the second scanning mirror 12a by the third scanning mirror 13a. Likewise, in this embodiment, the third scanning unit 13 also can be a galvano mirror, and the third resonance frequency also can be substantially the same as the second scanning unit 12 (such as 1 KHz). However, this invention is not limited thereto.

The scanning position of the light on the first direction can be adjusted by the third scanning unit 13 and the scanning position of the light on the second direction can be adjusted by the second scanning unit 12, so that the scan can be implemented to a specific region of the surface of the sample. The advantage of the scan implemented to a specific region of the sample is at least that the measurement efficiency can be increased when only a desired region needs to be scanned, in comparison with the case where the image just can be generated after the surface of the sample is completely scanned. In addition, the enhancement of the efficiency will become more obvious when the high-resolution scan is implemented.

The optical image scanning component 1 of this embodiment further includes a control unit 14, which is electrically connected with the first scanning unit 11 and the second scanning unit 12 and outputs a first control signal and a second control signal so as to control the rotation of the first scanning mirror 11a and the rotation of the second scanning mirror 12a. Likewise, the control unit 14 also can be electrically connected with the third scanning unit 13 and can control the rotation of the third scanning mirror 13a by a third control signal.

In this embodiment, for example, the actuator 12b of the second scanning unit 12 will be electrically connected with the control unit 14 and drive the second scanning mirror 12a to rotate along the second direction (Y direction) as axis according to the second control signal. The actuator 13b of the third scanning unit 13 will drive the third scanning mirror 13a to rotate along the first direction (X direction) as axis according to the third control signal.

Figure 2:
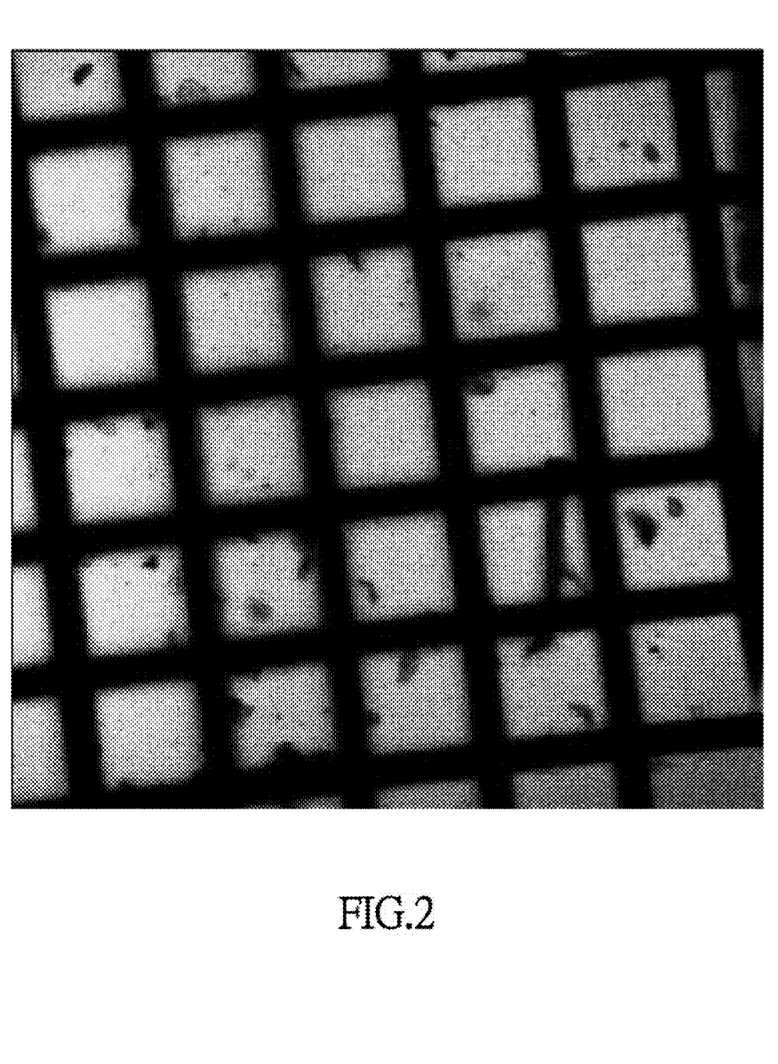
FIG. 2 is a schematic diagram of the scanning result of the monitor when the optical image scanning component operates in an embodiment of the invention.
Figure 3:
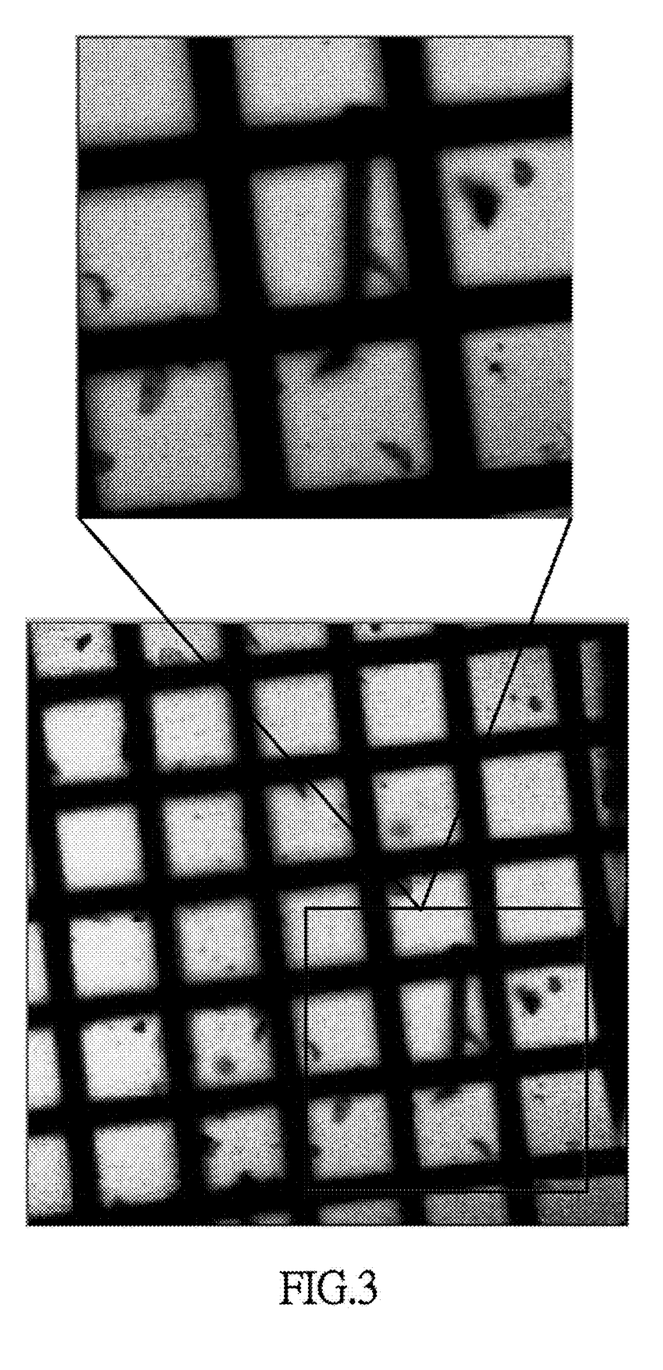
FIG. 3 is a schematic diagram of another scanning result of the monitor when the optical image scanning component operates in an embodiment of the invention.

Refer to FIGS. 2 and 3, wherein FIG. 2 is a schematic diagram of the scanning result of the monitor when the optical image scanning component operates in an embodiment of the invention, and FIG. 3 is a schematic diagram of another scanning result of the monitor when the optical image scanning component operates in an embodiment of the invention.

The following is the illustration about the control implemented by the optical image scanning component 1 through the control unit 14. FIG. 2 shows the scanning result of the surface of the sample, and the scanning result of this embodiment is obtained according to the maximum scanning ranges of the second scanning unit 12 and third scanning unit 13. The user can set the rotation angles of the third scanning unit 13 and second scanning unit 12 as, for example, from (0, 0) to (2, 2.08), which means the scan of the light transmitted to the third scanning unit 13 and the second scanning unit 12 will be implemented within the range of the above-mentioned coordinates. In this embodiment, the pixel number is set as 512 and the scanning rate is set as between 2.6 frame/s and 30 frame/s. However, this invention is not limited thereto, and for example, the scanning rate is set as between 0 frame/s and 30 frame/s. FIG. 3 illustratively shows the operation image of the scan implemented to a local region. Because the rotation angles of the third scanning unit 13 and the second scanning unit 12 can be separately controlled, this embodiment can further implement the scan to a local region by the method of inputting coordinates. The method of inputting coordinates can be to draw a marquee (such as the drawn rectangular pattern shown in the figure) on the region that has been scanned or to input the coordinates of the position. After drawing a marquee on the region that is to be scanned locally, a window (not shown) can be displayed to show the coordinates of the marquee, such as from (0.784, 0.94339) to (0.86528, 0.98113) in this embodiment, and the scanning result is displayed in the image of the left side.

Moreover, the user can adjust the number of the used scanning units according to different requirements. For example, the first scanning unit 11 can be set at a non-rotational state, and the rotational mode of the second scanning unit 12 and the third scanning unit 13 can be set in a slow scanning mode. When the first scanning unit 11, the second scanning unit 12 and the third scanning unit 13 are used together, they are in a rapid scanning mode.

Accordingly, the advantage of the above-mentioned manner is at least as following description. In comparison with the conventional art where the observation area is mostly adjusted by changing the position of the sample, the scanning method of the first scanning unit 11, the second scanning unit 12 and the third scanning unit 13 is changed in this invention to alter the internal optical path so as to adjust the observation area. Thereby, the measurement flexibility can be increased and the measurement error can be reduced (the calibration is required after each time of moving the sample of the conventional microscope device).

Figure 4:
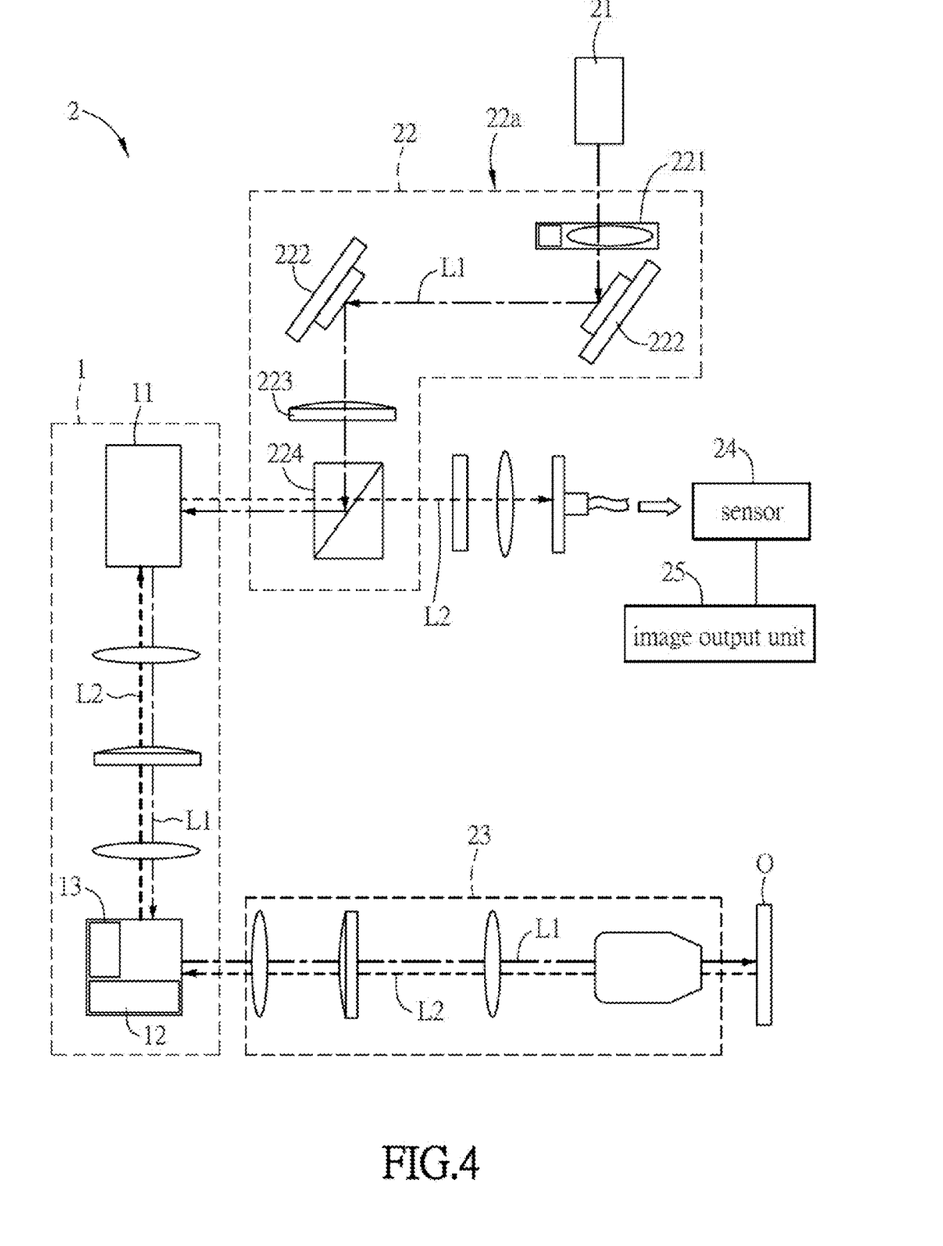
FIG. 4 is a schematic diagram of the configuration of the microscope device of an embodiment of the invention.
Figure 5:
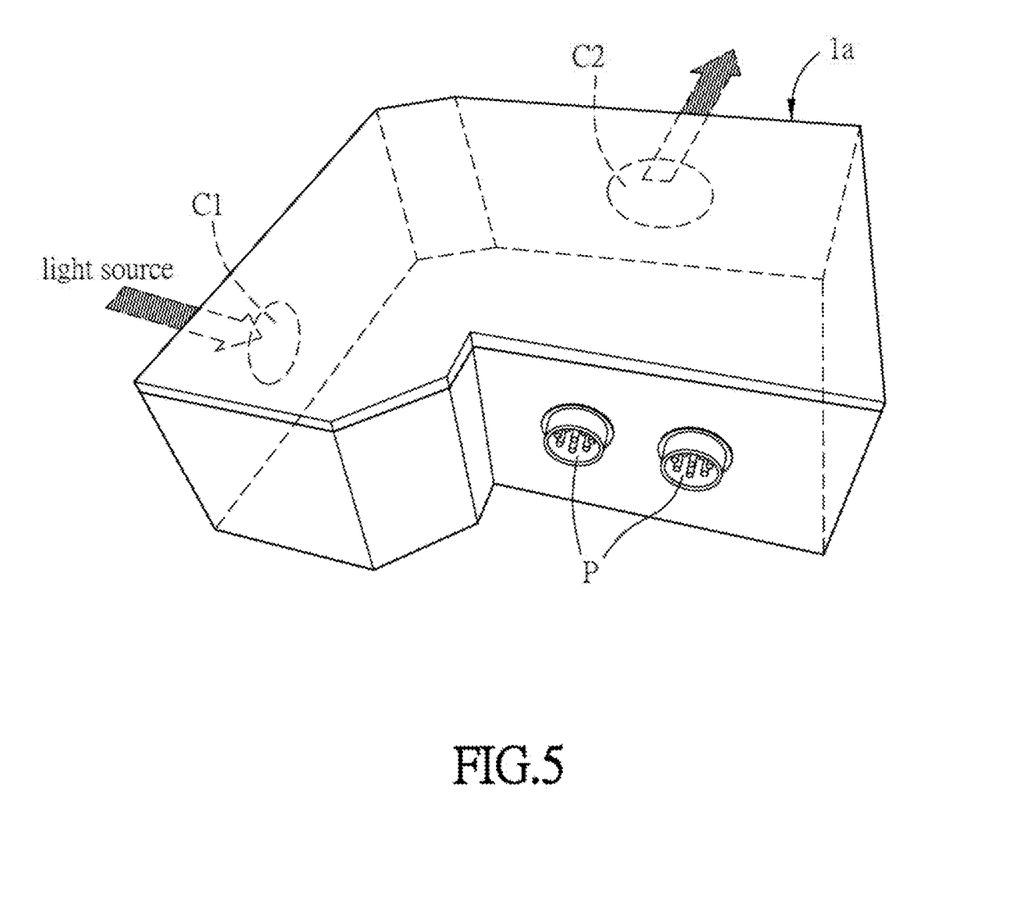
FIG. 5 is a schematic diagram of the optical image scanning component of the first embodiment of the invention.

Then, refer to FIGS. 4 and 5, wherein FIG. 4 is a schematic diagram of the configuration of the microscope device of an embodiment of the invention.

The microscope device 2 of this embodiment includes a light source 21, an optical module 22, an optical image scanning component 1 and an objective lens module 23. The optical image scanning component 1 can include the first scanning unit 11 and the second scanning unit 12. In this embodiment, the optical image scanning component 1 can further include the third scanning unit 13.

The light source 21 can provide a light. This embodiment marks the incident light with L1 and the reflected light with L2. The light source 21 can be a laser light source or a laser array for example. The light source 21 of this embodiment is illustrated as a laser light source, but the number and type of the light source 21 are not limited to this embodiment.

The optical module 22 includes a plurality of optical lenses and has a light input side 22a. The optical lenses of this embodiment can include a shutter 221, two reflectors 222, a collimating calibration element 223 and a light splitter 224. The shutter 221 can control whether the light can be emitted to the measured surface of the sample O. In detail, the opening and closing of the shutter 221 can be controlled by an electric signal. When the shutter 221 is at the opening state, the light will pass through the shutter 221 and reach the measured surface of the sample O, and the two reflectors 222, the collimating calibration element 223 and the light splitter 224 can transmit the light provided by the light source 21 to the optical image scanning component 1. On the contrary, when the shutter 221 is at the closing state, the light will be blocked and won't reach the sample O.

The optical image scanning component 1 of this embodiment is, for example but not limited to, as illustrated as the above embodiment. The implementation of the first scanning unit 11, the second scanning unit 12 and the third scanning unit 13 of the optical image scanning component 1 and the cooperation thereof can be comprehended by referring to the above description, so the related illustrations are omitted here for conciseness.

A microscope device 2 of this embodiment further includes a sensor 24 and an image output unit 25. The sensor 24 can receive the light L2 reflected by the sample O and output the sensing signal. The image output unit 25 is electrically connected with the sensor 24 and generates the image of the surface of the sample O according to the sensing signal, wherein the surface reflects the light coming from the guidance of the second scanning mirror 12a. The image output unit 25 can be, for example, any electronic device including a display screen, such as a desktop computer or a notebook computer.

Accordingly, in the practical operation, the light source 21 provides a light, and then the light will enter through the light input side 22a of the optical module 22. After passing through the optical module 22, the light is transmitted to the optical image scanning component 1.

The first scanning unit 11 is driven to rotate along a first direction and the second scanning unit 12 is driven to rotate along a second direction which is substantially perpendicular to the first direction. The light L1 is transmitted to the first scanning unit 11 and reflected by the first scanning unit 11 to the second scanning unit 12, and the light L1 will be reflected to the objective lens module 23 by the second scanning unit 12. The objective lens module 23 transmits the light L1 to the sample O. The light L2 reflected by the sample O is captured and an image is formed. The objective lens module 23 can concentrate the incident light on the surface of the sample O. Then, the sample O will reflect the light L2 to the objective lens module 23, and the light L2 reflected by the sample O will enter into the sensor 24 through the optical image scanning component 1. At this time, the sensor 24 can generate a sensing signal and the image output unit 25 forms the image.

Figure 6:
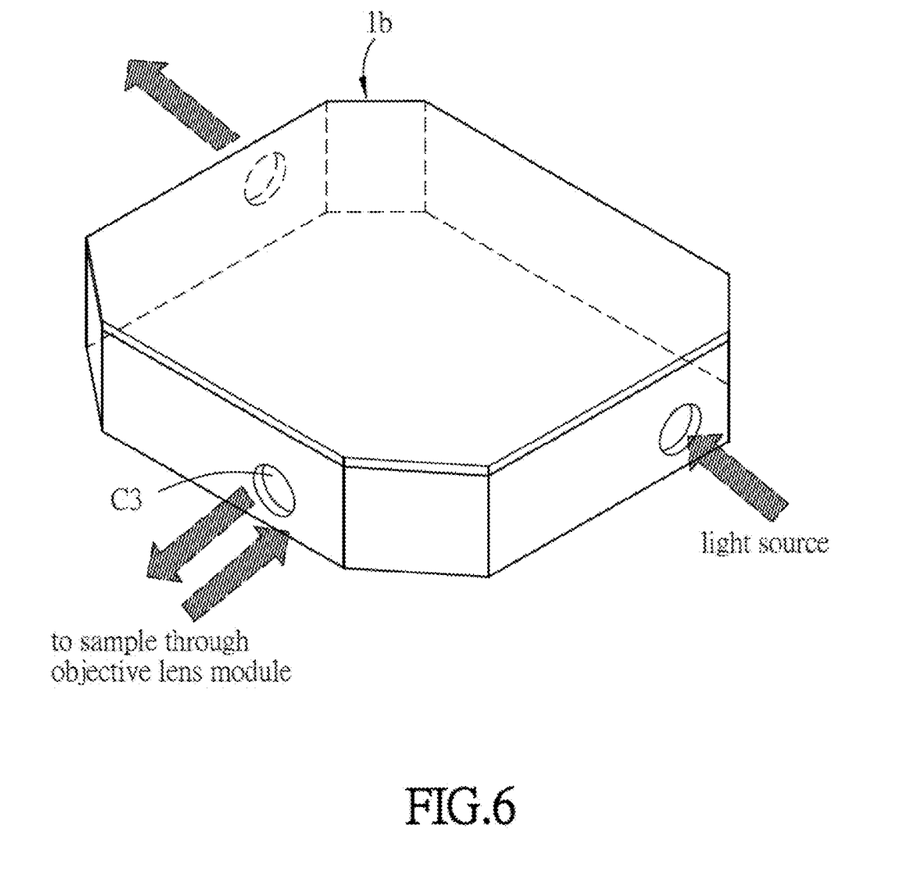
FIG. 6 is a schematic diagram of the optical image scanning component of the second embodiment of the invention.
Figure 7:
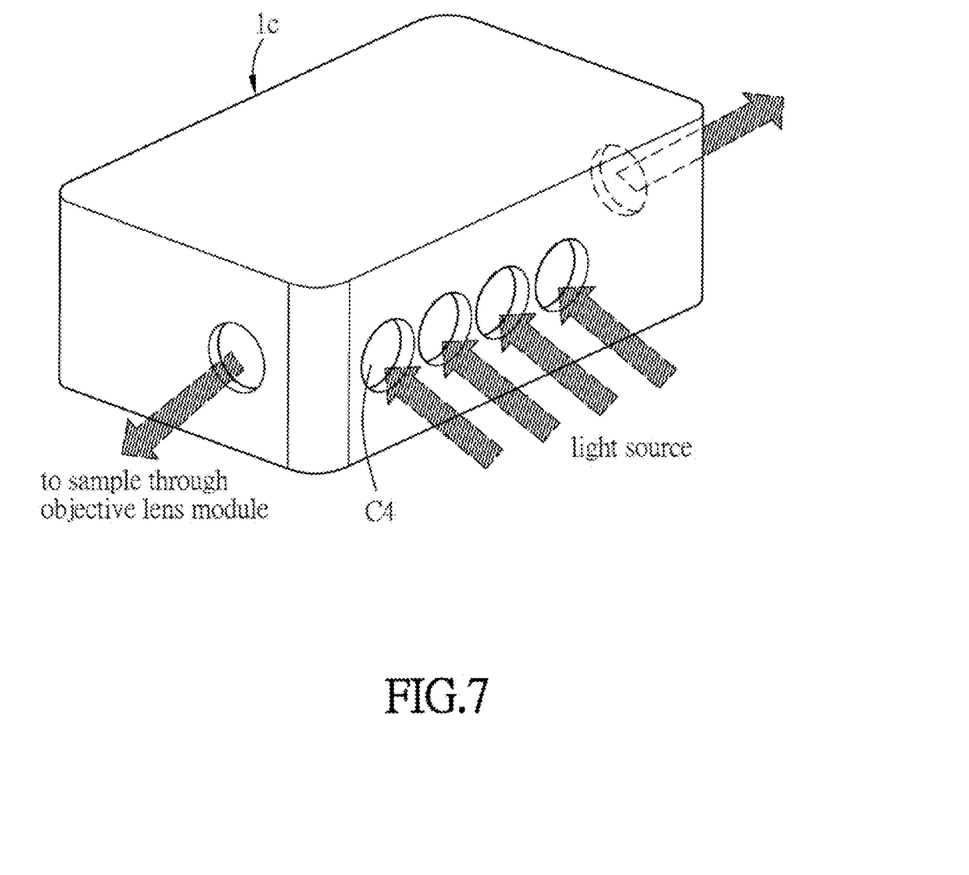
FIG. 7 is a schematic diagram of the optical image scanning component of the third embodiment of the invention.

Refer to FIGS. 5 to 7, which are schematic diagrams of the optical image scanning components of the first, second and third embodiments of the invention, respectively.

The optical image scanning modules 1a, 1b, 1c of these embodiments are, for example but not limited, as illustrated as the above embodiment. The inside structure of the optical image scanning component is not specially shown in the figures, but the structure and the elements that may be included in can be comprehended by referring to the above description, so the related illustrations are omitted here for conciseness.

The optical image scanning component 1a shown in FIG. 5 is a simpler structure and includes two connection ends C1 and C2. One connection end C1 can be connected to the optical fiber (not shown) to introduce the light source from the outside. After the light of the light source is adjusted by the optical image scanning component 1a, the adjusted light is transmitted to the microscope device through the other connection end C2 (maybe through the optical fiber as well) for the subsequent application. Furthermore, the optical image scanning component 1a can be disposed on the existing optical path of the microscope device to adjust the light.

In addition, the optical image scanning component 1a can further include at least two control ends P, and the control unit is electrically connected with the optical image scanning component 1a through the control ends P. The at least two control ends P receive different control signals to control the second scanning unit and the third scanning unit. The operations and the control methods of the second scanning unit and the third scanning unit are similar to the above embodiment, so the related illustrations are omitted here for conciseness.

For the comparison of the optical image scanning components 1b, 1c shown in FIGS. 6, 7, the optical image scanning component 1b further includes a connection end C3, which is used to collect the light signal and transmit the light signal to the microscope device. Herein, the light signal is a fluorescent signal or a Raman signal for example, and the microscope device can be directly connected with a photon detector such as a photomultiplier (PMT) or with a spectrometer so as to obtain the spectrum of the light signal for the analysis. There are at least two differences between FIGS. 6 and 7. In FIG. 7, there are a plurality of light receiving ends C4 to receive multiple light source inputs, so that in the application the scans can be implemented with different color lights to obtain the images and then the images of the multiple color lights can be combined to increase the scanning accuracy. Or, the above manner also can be applied to some embodiments where the scan is implemented with the excitation lights of different wavelengths. Besides, the direction of the optical path in FIG. 7 is different from that in FIG. 6, and in FIG. 7 the incoming light differs from the outgoing light by 90 degrees. However, this invention is not limited thereto, and the angle between the incoming light and the outgoing light can be adjusted according to the practical requirement.

To be noted, the user can choose to use the optical image scanning component 1a, 1b or 1c according to different requirements. For example, if the optical image scanning component 1a is used, the optical path is more flexible, wherein the optical image scanning component 1a can be used with the optical path that is designed by the user. The optical path setup of the optical image scanning component 1b is suitable for a general microscope device in the market and requires no adjustment. The optical image scanning component 1c can be applied to the multiple light sources or the more complicated application of the light source, in which, for example, different excitation lights or different color lights need to be used. For each of the optical image scanning components 1a, 1b, 1c, a general microscope device can be brought into the application together.

Summarily, this invention can enhance the scanning flexibility and applicability by providing two scanning units and respectively adjusting their scanning positions and scanning rates. Besides, the optical image scanning component of this invention can act as an additional component to cooperate with an existing microscope device. Thereby, this invention can provide an optical image scanning component and a microscope device which have a simple structure and can improve the rate of measurement.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical image scanning component suitable to receive a light provided by a light source of a microscope device, comprising:
    a first scanning unit comprising a first scanning mirror, which is rotated along a first direction as axis at a first resonance frequency;
    a second scanning unit comprising a second scanning mirror, which is rotated along a second direction as axis at a second resonance frequency which is lower than the first resonance frequency, wherein a scanning position of the microscope device on the second direction is adjustable by adjusting the rotation angle of the second scanning mirror; and
    a third scanning unit comprising a third scanning mirror, which is rotated along the first direction as axis at a third resonance frequency, and the third scanning unit disposed between the first scanning unit and the second scanning unit, wherein the scanning position of the microscope device on the first direction is adjustable by adjusting the rotation angle of the third scanning mirror,
    wherein the light is emitted to the first scanning mirror and reflected to the third scanning mirror by the first scanning mirror, the light is reflected to the second scanning mirror by the third scanning mirror, and the light is reflected by the second scanning mirror to be transmitted to an objective lens module of the microscope device.

2. The optical image scanning component as recited in claim 1, wherein the first resonance frequency is less than or equal to 32 KHz.

3. The optical image scanning component as recited in claim 2, wherein the second resonance frequency is 0~1 KHz.

4. The optical image scanning component as recited in claim 1, wherein the third resonance frequency is substantially the same as the second resonance frequency.

5. The optical image scanning component as recited in claim 1, wherein the first direction is substantially perpendicular to the second direction.

6. The optical image scanning component as recited in claim 1, further comprising:
- a control unit electrically connected with the first scanning unit and the second scanning unit and outputting a first control signal and a second control signal to control the first scanning mirror and the second scanning mirror to rotate.

7. The optical image scanning component as recited in claim 6, wherein the second scanning unit further comprises:
- an actuator, wherein the second scanning mirror is disposed on the actuator, and the actuator is electrically connected with the control unit and drives the second scanning mirror to rotate along the second direction as axis according to the second control signal.

8. The optical image scanning component as recited in claim 1, wherein the first scanning unit is a MEMS (Microelectromechanical Systems) element, a rotational poly-scanner or a resonant scanner.

9. A microscope device, comprising:
- a light source providing a light;
- an optical module comprising a plurality of optical lenses and having a light input side;
- an optical image scanning component comprising a first scanning unit, a second scanning unit and a third scanning unit, wherein the first scanning unit comprises a first scanning mirror rotated along a first direction as axis at a first resonance frequency, the second scanning unit comprises a second scanning mirror rotated along a second direction as axis at a second resonance frequency which is lower than the first resonance frequency, a scanning position of the microscope device on the second direction is adjustable by adjusting the rotation angle of the second scanning mirror, the third scanning unit comprises a third scanning mirror rotated along the first direction as axis at a third resonance frequency, the third scanning unit disposed between the first scanning unit and the second scanning unit, and the scanning position of the microscope device on the first direction is adjustable by adjusting the rotation angle of the third scanning mirror; and
- an objective lens module,
- wherein the light enters into the optical module through the light input side, when passing through the optical module, the light is emitted to the first scanning mirror and reflected to the third scanning mirror by the first scanning mirror, the light is reflected to the second scanning mirror by the third scanning mirror, and the light is reflected to the objective lens module by the second scanning mirror and is emitted to an sample after passing through the objective lens module.

10. The microscope device as recited in claim 9, wherein the first resonance frequency is less than or equal to 32 KHz.

11. The microscope device as recited in claim 10, wherein the second resonance frequency is 0~1 KHz.

12. The microscope device as recited in claim 9, wherein the third resonance frequency is substantially the same as the second resonance frequency.

13. The microscope device as recited in claim 9, wherein the first direction is substantially perpendicular to the second direction.

14. The microscope device as recited in claim 9, wherein the optical image scanning component further comprises:
- a control unit electrically connected with the first scanning unit and the second scanning unit and outputting a first control signal and a second control signal to control the first scanning mirror and the second scanning mirror to rotate.

15. The microscope device as recited in claim 14, wherein the second scanning unit further comprises:
- an actuator, wherein the second scanning mirror is disposed on the actuator, and the actuator is electrically connected with the control unit and drives the second scanning mirror to rotate along the second direction as axis according to the second control signal.

16. The microscope device as recited in claim 9, wherein the first scanning unit is a MEMS (Microelectromechanical Systems) element, a rotational poly-scanner or a resonant scanner.

* * * * *